United States Patent [19]

Henych et al.

[11] Patent Number: 4,762,555
[45] Date of Patent: Aug. 9, 1988

[54] PROCESS FOR THE PRODUCTION OF NODULAR CAST IRON

[75] Inventors: Ivo Henych, Stetten; Karl Gut, Benken, both of Switzerland

[73] Assignee: Georg Fischer Aktiengesellschaft, Schaffhause, Switzerland

[21] Appl. No.: 944,766

[22] Filed: Dec. 22, 1986

[30] Foreign Application Priority Data

Dec. 23, 1985 [CH] Switzerland ............... 5509/85

[51] Int. Cl.$^4$ ................................. C21C 7/00
[52] U.S. Cl. ........................................ 75/48; 75/51.7; 75/58
[58] Field of Search ............... 75/58, 48, 51.7

[56]  References Cited

U.S. PATENT DOCUMENTS

| | | | |
|---|---|---|---|
| 2,781,260 | 2/1957 | Grandpierre | 75/130 R |
| 2,870,004 | 1/1959 | Estes | 75/51.7 |
| 2,889,222 | 6/1959 | Kurzinski et al. | 75/130 R |
| 3,080,228 | 3/1963 | Hale et al. | 75/130 R |
| 3,197,306 | 6/1965 | Osborn et al. | 75/130 R |
| 3,295,960 | 6/1964 | Parlee et al. | 75/93 R |
| 3,421,887 | 6/1969 | Kusaka | 75/130 R |
| 3,764,305 | 10/1973 | Andersson | 75/130 R |
| 4,194,903 | 3/1980 | Hausen | 75/58 |
| 4,238,227 | 12/1980 | Golas | 75/58 |

*Primary Examiner*—Peter D. Rosenberg
*Attorney, Agent, or Firm*—Marmorek, Guttman & Rubenstein

[57]  ABSTRACT

A process for the production of nodular cast iron is disclosed. The process comprises adding magnesium to molten iron and then desulphurizing the melt. Next, the melt is after-treated with a neutral gas. The neutral gas which is introduced into the melt may be Ar, $N_2$, $CO_2$, or any combination thereof. The after-treatment with the neutral gas scavenges the melt for nonmetallic inclusions. The after-treatment may be performed by blowing the gas into the melt in a known manner using blowing lances or through a porous plug. In a preferred embodiment, the melt is also carburized by treatment with a gaseous hydrocarbon.

8 Claims, No Drawings

PROCESS FOR THE PRODUCTION OF NODULAR CAST IRON

BACKGROUND OF THE INVENTION

The present invention relates to a process for the after-treatment of a desulphurized, magnesium-alloyed molten cast iron intended for the production of nodular cast iron. The term "nodular cast iron" refers to iron having compact spheroidal graphite inclusions.

It is well known in the art to introduce addition substances having desulphurizing properties into molten cast iron in order to improve the quality of the resulting castings. Examples of addition substances having such properties include certain metals, such as magnesium, cerium, and calcium. Other addition substances include single and double salts of certain alkali metals, alkaline earth metals and rare earth metals.

It is also widely recognized that these desulphurizing agents may be introduced in amounts greater than that required for the desulphurization of the melt in order to obtain a product consisting of nodular cast iron. This excess metal causes uncombined carbon present in the melt to take the compact, spheroidal form characteristic of nodular cast iron. The nodular cast iron produced in this manner is ductile and possesses improved properties over that found in grey cast iron, where the uncombined carbon is present as normal flake graphite.

Typically, in the production of nodular cast iron from molten cast iron, the iron melt is treated with a desulphurizing agent, e.g., metallic magnesium (Mg). The magnesium which is thus added reacts with sulphur and oxygen contained in the molten cast iron and forms fine grains of magnesium sulphide and magnesium oxide. These fine grains are suspended throughout the melt and do not easily float up to the surface of the melt. After a long period of time passes, the fine grains will generally form a dross which may be more easily removable from the melt.

The difficulty in removing of these particles leads to problems due to the instability of the resulting grains of MgS and MgO. Whereas the usual temperature of the molten cast iron is at least 1300° C., the boiling point of magnesium is as low as 1107° C. Thus, while magnesium and related metals such as calcium are effective to desulphurize and deoxidize the molten cast iron, they are difficult to use because they escape as a vapor when added due to of the temperature of the melt. Accordingly, the molten cast iron which has been treated with magnesium cannot be left standing for a substantial period of time without a resulting loss of magnesium. This resulting loss of magnesium continues to progress upon standing until not enough remains to give the cast iron the desired spheroidal graphite structure.

Additionally, the temperature of the cast iron tends to drop during this standing period. It therefore becomes necessary to cast the molten cast iron before all of the dross can be removed, resulting in a cast which still contains unwanted MgS and MgO.

The prior art sought to solve this problem concerning the after-treatment of a desulphurized, Mg-alloyed iron melts by carrying out a process in which the molten cast iron is first treated with a magnesium alloy such as Mg-Ce, Mg-La, Mg-Fe-Si, or Mg-Ca-Si alloy and then inoculated with FeSi. This process still results in the formation of grains comprising MgS and MgO due to the high affinity between the elements. After a period of time elapses, the grains gradually combine with carbon and silicon and becomes a new dross which is easier to separate. However, in this procedure, the magnesium would still escape after a short period of time. Therefore, the cast iron once again must be cast while still containing these unwanted granular inclusions, as well as the excess magnesium necessary to produce the nodular cast iron.

In another approach, the after-treatment of desulphurized, magnesium-alloyed iron melts has consisted of treatment with a small amount of an additive consisting of a combination of at least one member selected from a group consisting of salts of fluorides of alkali metals, alkaline earth metals or rare earth metals and a powder of a calcium-silicon alloy in order to remove the dross, as disclosed in U.S. Pat. No. 3,421,887 (Kusaka). The mixed powder reacts with fluoride salt at high temperatures, thereby producing a new substance which is more readily removable. This process still leaves a certain amount of dross in the cast iron.

Other methods in the prior art which attempt to solve this problem focus upon the fact that while the treating materials used are effective to deoxidize and desulphurize the molten cast iron, they are difficult to use because they escape as vapors almost immediately at the temperature of the melt and because they usually have a low solubility in the melt. These prior art methods attempt to suppress the vaporization of the treating materials, such as magnesium, by introducing them into the melt under a neutral atmosphere which does not react with the agents.

U.S. Pat. No. 2,781,260 (Grandpierre), for example, discloses a method for desulphurization in which the addition element is liquified and added to a closed vessel containing molten cast iron. The air is then expelled from the closed vessel, followed by filling the vessel with an inert or nonoxidizing gas such as argon or nitrogen under high pressure. When the liquid metal makes contact with the addition metals, the addition metals in the melt have a tendency to evaporate. However, the pressure in the container is greater than the vapor pressure of the addition metals. Therefore, the addition metals remain liquid. After the mixing is complete, the argon is forced out of the vessel and is stored for repeated use. This method provides a greater proportion of the addition metal in the solidified metal than the processes previously described.

Likewise, U.S. Pat. No. 3,295,960 (Parlee) also discloses a treatment method in which an inert or nonoxidizing gas, such as helium, or any of the noble gases, and in some cases carbon monoxide or hydrogen, is introduced into a closed chamber at high pressures. A condensing means is provided which allows the temperature of the treatment materials to be varied, thus achieving different degrees of activity from the treatment materials.

Both U.S. Pat No. 2,781,260 and U.S. Pat. No. 3,295,960 employ inert or nonoxidizing gases in order to perform the function of creating an over-pressure in order to exclude undesirable gases and suppress vaporization of volatile materials. These gases do not react with or otherwise affect the melt itself. They do not participate in the removal of the grains which are formed in the melt. Thus, in both of these processes, the melt must be left standing for a period of time in order to allow the grains to float to the surface so that they can be removed.

In two other prior art references U.S. Pat. No. 3,080,228 (Hale et al.) and U.S. Pat. No. 2,889,222 (Kurzinski) nodularizing agents, desulphurizing agents, or other inoculants are entrained in a stream a neutral gas which is injected into the molten cast iron. These procedures are directed to a process for the introduction of such agents into the melt. They are not directed to a process for the removal of nonmetallic inclusions.

It is therefore an object of the present invention to provide a process for the removal of dispersed, nonmetallic inclusions in the molten cast iron after its desulphurization with magnesium.

It is another object of the present invention to provide a process for the removal of nonmetallic, dispersed inclusions in molten cast iron which is quick and does not result in a temperature drop.

It is a further object of the present invention to adequately control the nuclear state of molten cast iron without the addition of accompanying elements such as silicon.

SUMMARY AND DETAILED DESCRIPTION OF THE PREFERRED EMBODIMENTS

These and other objects can be achieved by means of the present invention which provides a process for producing nodular cast iron, which comprises adding magnesium to molten cast iron to desulphurize it and to produce nodular cast iron, and then treating the melt by blowing neutral gases or gaseous mixtures through the molten cast iron to remove the nonmetallic inclusions, such as MgS and MgO. (As used herein, the term "neutral gas" means a gas that will not react with or otherwise adversely affect the molten metal or the volatile treating materials.)

According to this process, the nonmetallic inclusions present in the melt, such as sulphur and sulphur compounds, are removed by scavenging the melt with neutral gases such as argon (Ar), nitrogen ($N_2$), carbon dioxide ($CO_2$), or any combination of these gases.

By blowing these gases or gaseous mixtures through the molten cast iron, the nonmetallic inclusions which are left in the melt following the desulphurization process, such as sulphur, oxygen and solid oxide inclusions, are carried to an appropriate area of the treatment vessel for removal. Thus, for example, the inclusions may be carried to the surface of the melt where they may be skimmed off.

The blowing of this gas or gaseous mixture is accomplished in a known manner using lances to introduce the gas directly into the melt, or through a porous plug located at the bottom of the vessel containing the molten iron.

While these neutral gases or gaseous mixtures come into direct contact with the molten cast iron as they pass through the molten material, they do not react with or otherwise adversely affect the molten cast iron.

In this manner, the nonmetallic inclusions may be removed quickly and without the temperature and magnesium losses which were present in the methods known in the prior art. Additionally, this novel procedure eliminates the need for introducing accompanying elements such as silicon.

In a preferred embodiment, the carburization of the desulphurized, Mg-alloyed molten cast iron can also be carried out by blowing gaseous hydrocarbon into the melt in a first phase, and then blowing Ar or one of the other neutral gases mentioned above into the melt as a second phase. This two-step process results in the additional carburization of the molten cast iron and the removal of hydrogen which is formed as a by-product.

As a result, additional formation of the compact spheroidal graphite inclusions, necessary in the formation of nodular cast iron, takes place.

Common metals such as iron dissolve small quantities of hydrogen at elevated temperatures. Accordingly, a certain quantity of hydrogen will dissolve at the elevated temperatures found in the molten iron. An additional amount of hydrogen is added to the already present dissolved hydrogen because of the addition of the hydrocarbon. Also, a certain amount of the magnesium which is present in the melt will combine directly with the hydrogen gas at these elevated temperatures. On cooling, the gas comes out of solution and results in severe degradation of the mechanical properties of the iron. This is referred to as hydrogen embrittlement. This severe degradation of the iron is prevented by the degassing of the molten cast iron by the addition of Ar. In addition to the removal of hydrogen, the scavenging and sparging action provided by the Ar also promotes removal of carbon monoxide and other gases from the melt.

In another preferred embodiment, either air, a gaseous mixture of Ar and $O_2$, a gaseous mixture of $N_2$ and $O_2$, or any combination thereof, having a 1 to 30% $O_2$, proportion is blown into the molten cast iron. This allows the nuclear state of the melt to be controlled by a planned oxidation of the magnesium.

The following examples will serve to further illustrate the present invention, but are not meant to limit it thereto.

EXAMPLE 1

Molten iron treated with magnesium in a 500 kg ladle was scavenged for 30 seconds with argon using a lance of diameter 8 mm, at a flow rate of 30 liters per minute. Metalographic examination of the castings revealed a definite reduction of non-metallic inclusions.

The tests with a ceramic filter, following argon scavenging, in the case of a casting weighing 12.5 kg revealed a 40% reduction of the non-metallic substances retained by the filter.

EXAMPLE 2

A magnesium-treated, desulphurized melt with Mg=0.05%, sulphur=0.008%, was scavenged for 30 seconds at a temperature of 1450° C. with a mixture of 90% $N_2$ and 10% $O_2$, the flow rate being 22 liters per minute. Comparison of castings weighing 12.5 kg revealed that a reduction of superfine hardening (carbide) reduced the wall thickness from 5 mm to 3 mm, and that there was an increase in the number of nodules from 180 per square mm to 240 per square mm.

While the invention has been described by reference to specific embodiments, this was for purposes of illustration only and should not be construed to limit the spirit or the scope of the invention.

We claim:
1. A process for the after-treatment of desulfurized cast iron intended for the production of nodular cast iron, comprising
   treating molten cast iron with metallic magnesium to produce a desulfurized, Mg-alloyed iron melt having magnesium sulfide and magnesium oxide inclusions therein, and thereafter treating the desulfurized, Mg-alloyed iron melt with a neutral gas to remove said magnesium sulfide and magnesium oxide inclusions.

2. The process of claim 1, wherein said neutral gas is a gas selected from the group consisting of Ar, $N_2$, $CO_2$, and mixtures thereof.

3. The process of claim 1 wherein said desulphurized iron melt is treated with said neutral gas by blowing said gas through said desulphurized iron melt.

4. The process of claim 1 further comprising carburizing said desulphurized, Mg-alloyed iron melt by treating it with a gaseous hydrocarbon prior to treatment with said neutral gas.

5. The process of claim 4, wherein said neutral gas comprises Ar.

6. The process of claim 2, further comprising treating said desulphurized iron melt with an oxidizing gas selected from the group consisting of air, $Ar+O_2$, $N_2+O_2$, and mixtures thereof, whereby the nuclear state of the molten cast iron is controlled by a planned oxidation.

7. The process of claim 6, wherein said oxidizing gas has a 1 to 30% proportion of $O_2$.

8. The process of claim 6, wherein said desulphurized iron melt is treated with said oxidizing gas by blowing said gas through said desulphurized melt.

* * * * *